Patented July 28, 1925.

1,547,554

UNITED STATES PATENT OFFICE.

MAX BÖGEMANN, OF ELBERFELD, PAUL IMHOFF, OF LEVERKUSEN-ON-THE-RHINE, AND WILHELM SCHEPSS, OF WIESDORF-ON-THE-RHINE, GERMANY, ASSIGNORS TO FARBENFABRIKEN VORM. FRIEDR. BAYER AND CO., OF LEVERKUSEN, NEAR COLOGNE-ON-THE-RHINE, GERMANY.

ARTICLE OF MANUFACTURE, VULCANIZED RUBBER.

No Drawing. Application filed June 3, 1924. Serial No. 717,639.

*To all whom it may concern:*

Be it known that we, MAX BÖGEMANN, PAUL IMHOFF, and WILHELM SCHEPSS, citizens of Germany, residing at Elberfeld, Leverkusen-on-the-Rhine, and Wiesdorf-on-the-Rhine, State of Prussia, Germany, have invented new and useful Improvements in a New Article of Manufacture, Vulcanized Rubber, of which the following is a specification.

In Patents 1,126,469 and 1,149,580 there are described processes for materially promoting the vulcanization of rubber by the use of bases, such as piperidine or its derivatives etc.

We have now found that for this purpose dimer or polymer hydrogenated pyridines e. g. the dipiperidyl or polypiperidyl compounds (see Berichte der deutschen chemischen Gesellschaft Vol. 46 (1913) page 1767) can advantageously be used. These compounds are not mentioned in the above cited patents. They are obtained when pyridine compounds are reduced by electrolysis. As accelerators for vulcanization must practically be used in a powdered state the solid bases e. g. the gamma-gamma-dipiperidyl:

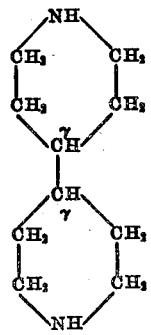

can be used directly.

The liquid bases e. g. the alpha-alpha-dipiperidyl

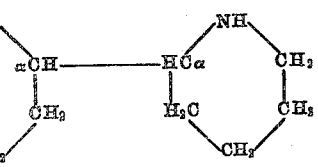

are best converted before use into a solid derivative e. g. by a treatment with carbon disulfide into its dithiocarbamate (see Annales de Chimie et de Physique, Serie III, Vol. 38, page 88):

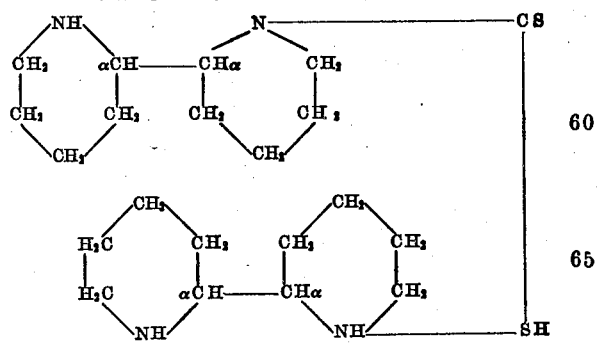

Di- or polymer-hydrogenated quinoline bases can also be used (see Zeitschrift für Elektrochemie 2 (1895) page 580).

The following example further illustrates the new process, the parts being by weight:

A mixture of 78 parts of para-rubber, 3.1 parts of sulfur, 9.4 parts of zinc oxide and 3 parts of dipiperidyl are vulcanized for 20–50 minutes under a pressure of 1.5 atmospheres. A well thoroughly vulcanized product results.

The tri-molecular hydroquinoline can also be used or other of the above mentioned compounds.

Of course artificial caoutchouc can be used.

We claim:—

1. The process of producing a vulcanized rubber which comprises incorporating into rubber a small amount of a dimer hydrogenated pyridine compound and heating the resulting product with a vulcanizing agent to effect vulcanization.

2. The process of producing a vulcanized rubber which comprises incorporating into rubber a small amount of a polymer hydrogenated pyridine compound and heating the resulting product with a vulcanizing agent to effect vulcanization.

3. The process of producing a vulcanized rubber which comprises incorporating into rubber a small amount of a salt of a dimer hydrogenated pyridine compound and heating the resulting product with a vulcanizing agent to effect vulcanization.

4. The process of producing a vulcanized rubber which comprises incorporating into rubber a small amount of a salt of a polymer hydrogenated pyridine compound and heating the resulting product with a vulcanizing agent to effect vulcanization.

5. The process of producing a vulcanized rubber which comprises incorporating into rubber a small amount of a dipiperidyl base and heating the resulting product with a vulcanizing agent to effect vulcanization.

6. As a new article of manufacture a vulcanized rubber combined before vulcanization with a small amount of a dimer hydrogenated pyridine compound.

7. As a new article of manufacture a vulcanized rubber combined before vulcanization with a small amount of a polymer hydrogenated pyridine compound.

8. As a new article of manufacture a vulcanized rubber combined before vulcanization with a small amount of a salt of a dimer hydrogenated pyridine compound.

9. As a new article of manufacture a vulcanized rubber combined before vulcanization with a small amount of a salt of a polymer hydrogenated pyridine compound.

In testimony whereof we have hereunto set our hands.

MAX BÖGEMANN.
PAUL IMHOFF.
WILHELM SCHEPSS.